(12) United States Patent
Huhn et al.

(10) Patent No.: US 10,760,513 B1
(45) Date of Patent: Sep. 1, 2020

(54) ENGINE AND METHOD FOR EXHAUST AFTERTREATMENT

(71) Applicant: Caterpillar Inc., Deerfield, IL (US)

(72) Inventors: Spencer Huhn, Chillicothe, IL (US); Wade J. Robel, Dunlap, IL (US); Lifeng Wang, Dunlap, IL (US); Dana Coldren, Secor, IL (US); Kevin Weiss, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/389,299

(22) Filed: Apr. 19, 2019

(51) Int. Cl.
*F02D 41/14* (2006.01)
*F02D 19/02* (2006.01)
*F02M 21/02* (2006.01)
*F01N 3/20* (2006.01)

(52) U.S. Cl.
CPC ....... *F02D 41/1446* (2013.01); *F02D 19/024* (2013.01); *F02M 21/0275* (2013.01); *F01N 3/2066* (2013.01); *F01N 2610/02* (2013.01); *F02D 2200/0602* (2013.01)

(58) Field of Classification Search
CPC ............. F02D 19/024; F02D 41/1446; F02D 2200/0602; F02M 21/0275; F01N 3/2066
USPC ......................................................... 60/274
See application file for complete search history.

(56) References Cited

U.S. PATENT DOCUMENTS

| 5,195,485 | A | * | 3/1993 | Jensen | F02D 17/02 123/198 F |
|---|---|---|---|---|---|
| 9,611,793 | B2 | | 4/2017 | Sunley et al. | |
| 2003/0110762 | A1 | * | 6/2003 | Rozario | F02D 41/0245 60/284 |
| 2009/0292439 | A1 | * | 11/2009 | Luken | F02D 17/02 701/102 |
| 2010/0154412 | A1 | | 6/2010 | Andreae et al. | |
| 2012/0046853 | A1 | * | 2/2012 | Silvestri | F02D 41/1402 701/104 |
| 2013/0333351 | A1 | | 12/2013 | Vyas et al. | |
| 2017/0211493 | A1 | | 7/2017 | Kidd et al. | |
| 2018/0010515 | A1 | | 1/2018 | Kolhouse et al. | |
| 2018/0223757 | A1 | | 8/2018 | Mccarthy, Jr. et al. | |

FOREIGN PATENT DOCUMENTS

WO 2015035133 A1 3/2015

* cited by examiner

*Primary Examiner* — Mark A Laurenzi
*Assistant Examiner* — Dapinder Singh
(74) *Attorney, Agent, or Firm* — Bookoff McAndrews

(57) ABSTRACT

A method of increasing parasitic load on an internal combustion engine includes injecting a fuel into a combustion chamber of an active cylinder of the internal combustion engine, combusting the injected fuel in the combustion chamber of the active cylinder, and determining that increasing a temperature of an exhaust aftertreatment device is required. The method includes increasing a parasitic load on the internal combustion engine by deactivating a cylinder, wherein no fuel is injected in the deactivated cylinder for a combustion cycle of the internal combustion engine, and further increasing the parasitic load by pulsing a spill valve member of a spill valve of a fuel injector in the deactivated cylinder between a fully closed position and an at least partially open position.

20 Claims, 5 Drawing Sheets

ENGINE AND METHOD FOR EXHAUST AFTERTREATMENT

TECHNICAL FIELD

The present disclosure relates generally to an internal combustion engine, and more particularly, to methods and systems for internal combustion engines having one or more exhaust aftertreatment devices.

BACKGROUND

Internal combustion engines are used in various mobile and stationary machines to generate power by the combustion of a fuel such as diesel fuel. In many applications, it is desirable to reduce the emission of particulate matter (e.g., soot) and/or nitrogen oxides ($NO_x$) produced by the operation of the engine. With this goal in mind, exhaust systems of internal combustion engines may include one or more devices that treat exhaust prior to releasing the exhaust into the environment. Such devices, which may be referred to as aftertreatment devices, may include particulate traps that capture particulate matter, and/or catalysts that react with exhaust (e.g., by catalyzing a reaction) to reduce $NO_x$ emissions.

Under certain conditions, the aftertreatment device may underperform and/or suffer a marked decline in performance. For example, when an ambient temperature or the temperature of the engine is low, an aftertreatment device including a catalyst may perform inefficiently. In such cases, exhaust emissions may fall short of emissions guidelines until a temperature of the aftertreatment device reaches a minimum temperature. Additionally, operating an internal combustion engine in an idle load level for extended periods of time may result in hydrocarbon buildup that negatively affects performance. In addition to hydrocarbon buildup, sulfur buildup may even largely deactivate aftertreatment devices such as diesel particulate filters. In order to restore the performance of the aftertreatment device, a regeneration may be performed. Regeneration may include raising the temperature of the aftertreatment device to a desired level for a period of time to remove hydrocarbons and/or sulfur.

An exemplary apparatus including an engine load module is disclosed in International Publication No. WO 2015/035133 A1 ("the '133 publication") to Mehrotra et al. The apparatus described in the '133 publication may generate a request to deactivate a cylinder to lead to an increase in combustion temperatures and therefore, an increase in exhaust gas temperatures. While the cylinder deactivation described in the '133 publication may be useful to raise exhaust gas temperatures in some situations, the apparatus described in the '133 publication may not be useful in other situations, for example where cylinder deactivation does not raise exhaust gas temperatures to a level capable of sufficiently warming or regenerating an exhaust aftertreatment device.

The disclosed method and system may solve one or more of the problems set forth above and/or other problems in the art. The scope of the current disclosure, however, is defined by the attached claims, and not by the ability to solve any specific problem.

SUMMARY

In one aspect, a method of increasing parasitic load on an internal combustion engine may include injecting a fuel into a combustion chamber of an active cylinder of the internal combustion engine, combusting the injected fuel in the combustion chamber of the active cylinder, and determining that increasing a temperature of an exhaust aftertreatment device is required. The method may include increasing a parasitic load on the internal combustion engine by deactivating a cylinder, wherein no fuel is injected in the deactivated cylinder for a combustion cycle of the internal combustion engine, and further increasing the parasitic load by pulsing a spill valve member of a spill valve of a fuel injector in the deactivated cylinder between a fully closed position and an at least partially open position.

In another aspect, a method of increasing parasitic load on an internal combustion engine may include injecting a fuel into a combustion chamber of an active cylinder of the internal combustion engine, combusting the injected fuel in the combustion chamber of the active cylinder, and determining that increasing a temperature of an exhaust aftertreatment device is required. The method may also include increasing a parasitic load on the internal combustion engine by performing a first strategy that includes deactivating at least one cylinder, determining that the first strategy does not provide a predetermined exhaust temperature, and further increasing the parasitic load by pulsing a spill valve member of a spill valve of a fuel injector in the deactivated cylinder between a fully closed position and an at least partially open position.

In another aspect, an internal combustion engine may include a plurality of cylinders, each of the plurality of cylinders having a combustion chamber, a plurality of fuel injectors each configured to inject fuel into a respective combustion chamber, each of the fuel injectors including a spill valve having a spill valve member, and an aftertreatment device configured to receive exhaust produced by combustion in the plurality of cylinders. The internal combustion engine may also include a sensor configured to measure at least one of an exhaust temperature or a temperature of the aftertreatment device, and a controller configured to control each of the fuel injectors. The controller may be configured to control each of the fuel injectors such that a first fuel injector of the plurality of fuel injectors injects fuel for combustion in an active cylinder of the plurality of cylinders, a spill valve member of a second fuel injector of the plurality of fuel injectors in a deactivated cylinder of the plurality of cylinders is pulsed between a fully closed position and an at least partially open position, and the second fuel injector injects fuel into the deactivated cylinder at a timing that avoids combustion of the fuel in the deactivated cylinder.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
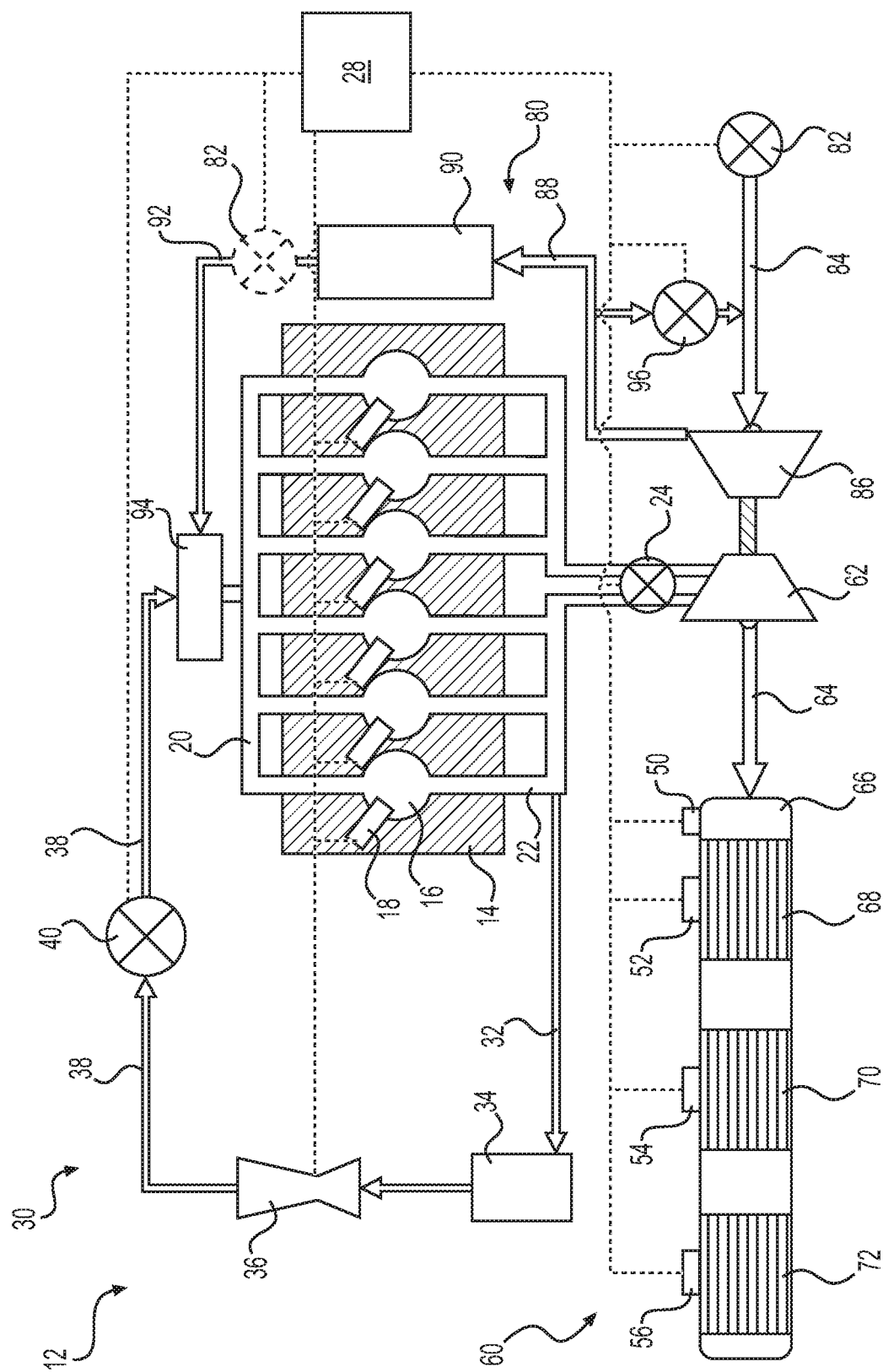
FIG. 1 is a schematic view of an internal combustion engine system including an aftertreatment system according an aspect of the present disclosure.

FIG. 1 is a schematic cross-sectional view of an internal combustion engine system 12. Internal combustion engine system 12 may include a plurality of engine cylinders 16 formed in an engine block 14, wherein the engine cylinders 16 are fluidly connected to an air intake system 80, an exhaust gas recirculation (EGR) system 30, and an exhaust or aftertreatment system 60. Engine cylinders 16 combust an air fuel mixture and expel combustion gases during operation of internal combustion engine system 12. While six engine cylinders 16 are shown in the exemplary configuration of FIG. 1, the number of cylinders 16 may be more or less than six. Engine cylinders 16 may be connected to intake system 80 via an intake manifold 20 on an intake side of internal combustion engine system 12, and to EGR system 30 and aftertreatment system 60 via an exhaust manifold 22 on an exhaust side of internal combustion engine system 12.

Air intake system 80 may receive intake air via an air intake valve 82. An intake passage 84 may connect air intake valve 82 to a compressor 86. Compressor 86 may include an outlet connected to an end of passage 88 to provide compressed air to an air cooler 90. A boost recirculation passage and valve 96 may connect passage 88 to intake passage 84 to recirculate some of the compressed air. As shown in FIG. 1, air cooler 90 may be connected between compressor passage 88 and a cooled air passage 92 that extends to a mixer 94. In an exemplary configuration, air intake valve 82 may be provided within cooled air passage 92, as shown in dashed lines in FIG. 1. Mixer 94 may be fluidly connected to intake ports of engine cylinders 16 to provide intake air to each engine cylinder 16. Mixer 94 may also mix a quantity of recirculated exhaust air from EGR system 30 with the fresh air received from air intake system 80.

EGR system 30 of internal combustion engine system 12 may include an inlet end connected to exhaust manifold 22 and an outlet end at mixer 94. For example, an exhaust passage 32 may extend from exhaust manifold 22 to divert a portion of exhaust gas from cylinders 16. The exhaust passage 32 may connect to an EGR cooler 34 provided upstream of a mass air flow sensor 36. A EGR return passage 38 including an EGR valve 40 may extend between mass air flow sensor 36 and mixer 94.

Aftertreatment system 60 may be connected to exhaust manifold 22 via an exhaust valve 24 to treat and remove exhaust generated within cylinders 16. Exhaust valve 24 may be an exhaust balance valve configured to control a flow of exhaust gases to a turbine 62. Exhaust gases passing from an outlet of exhaust valve 24 may drive a turbine 62 connected via a shaft to compressor 86. An exhaust outlet passage 64 extending from turbine 62 may provide a conduit for a flow of exhaust from turbine 62 to a canister 66 that forms a housing for one or more aftertreatment devices. In the exemplary configuration of FIG. 1, aftertreatment devices within canister 66 may include a diesel particulate filter (DPF) 68 that may be configured to reduce soot and particulate matter. DPF 68 may include an additional diesel particulate filter coated with a catalyst, or the diesel particulate filter 68 (as shown in FIG. 1) may itself be coated with a catalyst. In addition to DPF 64, aftertreatment devices may include an oxidation catalyst such as selective catalytic reduction (SCR) device 70 and/or an ammonia oxidation device 72. If desired, additional aftertreatment devices may be included. While a single canister 66 is shown in FIG. 1, each of the aftertreatment devices may be provided in an additional canister or housing.

A controller 28 of internal combustion engine system 12 may be configured to receive feedback information, determine operational attributes of internal combustion engine system 12 based on the received feedback, and control various operations of internal combustion engine system 12 accordingly. For example, controller 28 may output control signals to air intake valve 82, recirculation valve 96, exhaust valve 24, injectors 18, EGR valve 40, as well as other components of internal combustion engine system 12. Controller 28 may be a stand-alone controller, such as an engine control module (ECM), or may be a part of a larger control unit.

Controller 28 may receive operational (feedback) information from an engine speed sensor (not shown), mass airflow sensor 36, and feedback information from each of the components controlled by controller 28. Controller 28 may also receive feedback information from a plurality of sensors provided to one or more components of aftertreatment system 60. These sensors may include one or more temperature sensors (e.g., thermistors) 50, 52, 54, and 56. Temperature sensor 50 may be configured to detect a temperature of exhaust gas produced by internal combustion engine system 12. One temperature sensor 50 may be provided at an upstream end of canister 66. Thus, sensor 50 may be configured to detect a temperature of exhaust gas as it flows into canister 66 before reaching an aftertreatment device. Alternatively, temperature sensor 50 may be provided within exhaust outlet passage 64 to detect a temperature of exhaust flowing from turbine 62 before the exhaust gas enters canister 66. The temperature of exhaust measured by sensor 50 may serve as a proxy for a temperature of one or more of the aftertreatment devices. Thus, in some embodiments, temperature sensors 52, 54, and/or 56 may be omitted. Additionally, a plurality of temperature sensors 50 may be provided at multiple locations to provide additional information with respect to the temperature of exhaust.

Sensors 52, 54, and/or 56 may be provided within canister 66 to determine a temperature of one or more of aftertreatment devices, such as DPF 68, SCR device 70, and/or ammonia oxidation device 72. Additionally, one or more of sensors 52, 54, and/or 56 may include a soot sensor or particulate matter sensor. Soot or particulate matter may be detected by differential pressure, radio frequency, or electrical detection methods. In one aspect, sensor 52 may include a soot sensor that is configured to detect a presence of soot in DPF 68. Sensor 52 may include both a soot and temperature sensors.

During operation, internal combustion engine system 12 may be configured to produce exhaust at a temperature sufficient to regenerate an aftertreatment device such as DPF 68, SCR device 70, and/or oxidation device 72. Controller 28 may determine that a regeneration condition is satisfied based on feedback from one or more of the sensors 50, 52, 54, and 56, and/one or more operating conditions (e.g., operating time, temperature, and/or load factor) of internal combustion engine system 12. When controller 28 determines that regeneration is necessary, controller 28 may increase a parasitic load on internal combustion engine system 12 to raise exhaust temperatures to a predetermined regeneration temperature threshold. During regeneration, controller 28 may further control internal combustion engine system 12 to ensure that regeneration is performed below a predetermined maximum exhaust temperature. In one aspect, controller 28 may store a plurality of predetermined regeneration temperature thresholds that correspond to a corresponding plurality of regeneration strategies (e.g., soot removal, hydrocarbon removal, sulfur removal, etc.) For example, minimum and maximum exhaust temperatures for regeneration of the an aftertreatment device may be 300° C. and 450° C. for soot removal, 420° and 520° for sulfur removal, and 250° and 300° for hydrocarbon removal, respectively. The duration of a regeneration event may be similarly different for different events.

During a cold start of engine system 12, controller 28 may, based on temperature feedback from one or more of the sensors 50, 52, 54, and 56, determine that internal combustion engine system 12 is in a cold start condition where warmup is required. When warmup is required, controller 28 may increase a parasitic load on internal combustion engine system 12 to raise exhaust temperatures (thereby raising the temperature of the aftertreatment device) to a predetermined warmup temperature threshold.

Figures 2A, 2B:
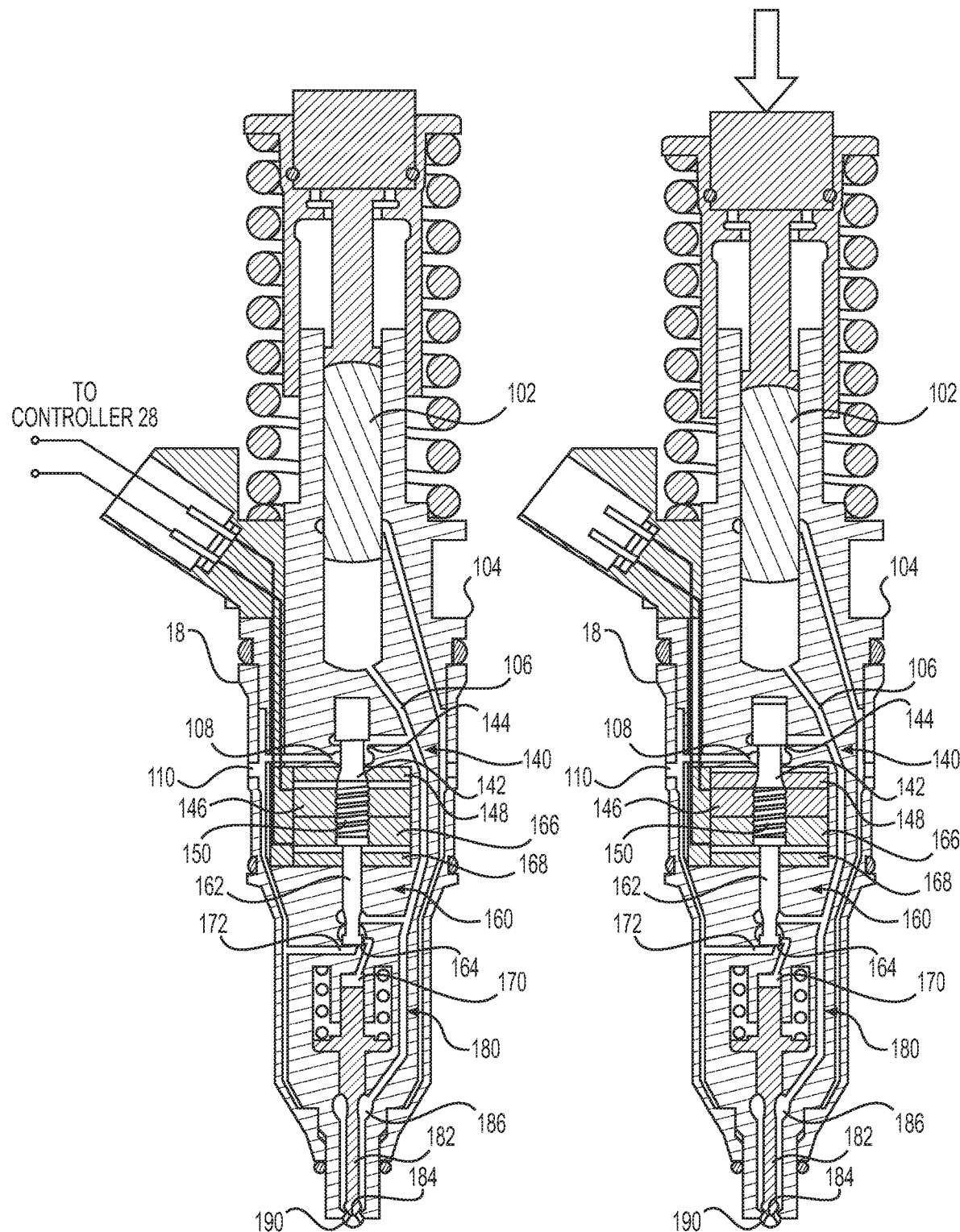
FIGS. 2A and 2B are a cross-sectional views of a fuel injector of the internal combustion engine of FIG. 1.

FIGS. 2A and 2B are schematic views of a fuel injector 18 of internal combustion engine system 12. Fuel injector 18 may be formed as a mechanically-actuated and electronically-controlled unit fuel injector (MEUI). An injector body 104 may extend from a proximal end in which a displaceable plunger 102 is provided, to a distal end in which one or more outlet orifices 190 are formed. Between the plunger 102 and outlet orifices 190, a spill valve 140, a direct-operated control (DOC) valve 160, and a check valve 180 may be provided to inject fuel in a controlled manner. Fuel may enter an interior of injector body 104 via one or more supply and return passages 110.

Spill valve 140 may be provided between a fuel passage 106 which extends from plunger 102 and a fuel passage 108. Fuel passage 108 may be in fluid communication with a low-pressure path formed by supply and return passage 110. A spill valve member 142 may be moveable between an open position spaced from spill valve seat 144 (FIG. 2A) and a closed position in contact with spill valve seat 144 (FIG. 2B). A distal end of spill valve member 142 may be biased to the open position by a spring member 150. As shown in FIG. 2A, spill valve solenoid 146 may be in electrical communication with controller 28 to control a motion of spill valve member 142 via an armature 148. For example, when electrical current is applied to spill valve solenoid 146, armature 148 and spill valve member may be moved distally toward spring member 150, as shown in FIG. 2B.

Passage 106 may extend distally with respect to spill valve 140 to DOC valve 160. DOC valve 160 may include a DOC (control) valve member 162 that is movable between an open position in which DOC valve member 162 is spaced from DOC valve seat 164, and a closed position in which DOC valve member 162 rests upon a DOC valve seat 164 (FIGS. 2A and 2B). A proximal end of DOC valve member 162 may be biased to the closed position by spring member 150. As shown in FIG. 2A, a DOC valve solenoid 166 may be in electrical communication with controller 28 to control a motion of control valve member 162 via an armature 168. Similar to spill valve solenoid 146, when electrical current is applied to DOC valve solenoid 166, armature 168 and DOC valve member 162 may be moved, for example proximally, in a direction toward spring member 150.

A check valve 180 may be provided at a distal portion of fuel injector 18. Check valve 180 may include a needle member 182, check valve seat 184, pressure chamber 186, and outlet orifices 190. Check valve member 180 may be movable between a closed position where needle member 182 rests upon a check valve seat 184 to retain pressurized fuel within pressure chamber 186 (FIGS. 2A and 2B), and an open position in which pressurized fuel is released from outlet orifices 190 into a combustion chamber of a cylinder 16.

When DOC valve 160 is closed, DOC valve member 162 may rest upon DOC valve seat 164 and thereby isolate a control chamber 170 from a low-pressure passage 172. Control chamber 170 may be in fluid communication with passage 106 when DOC valve member 162 rests upon DOC valve seat 164. Thus, the pressure of fuel in control chamber 170 may increase with the pressure of fuel in passage 106. Control chamber 170 may be positioned so as to allow pressurized fuel therein to apply pressure to a proximal end of needle 182. When DOC valve member 162 moves away from DOC valve seat 164, low-pressure passage 172 may communicate with control chamber 170, thus allowing control chamber 170 to communicate with supply and return passage 110 via low-pressure passage 172.

INDUSTRIAL APPLICABILITY

The disclosed aspects of internal combustion engine system 12 may be employed in a variety of machines and/or vehicles. For example, internal combustion engine system 12 may be included in any stationary or mobile machine including one or more aftertreatment devices to improve emissions performance.

Internal combustion engine system 12 may be configured to operate under moderate or high load by maintaining each (e.g., all six) cylinder 16 in an active operation. An "active" or "activated" cylinder is a cylinder in which fuel is combusted within a combustion chamber during a combustion cycle of engine system 12 (e.g., an intake, power, compression, and exhaust stroke). In one aspect, moderate load or high load may correspond to a state in which a load factor of the internal combustion engine system 12 is above 50%. Load factor may be determined by controller 28 based on a maximum power, a maximum torque, a maximum fuel injection quantity, or other factors. A load factor of 50%, for example, may correspond to a state in which internal combustion engine system 12 outputs 50% of a maximum rated power. Rated power may be a rated torque, a rated horsepower, or another measure of rated. A load factor of 50% may, for example, correspond to a state in which the internal combustion engine system injects 50% of a maximum rated quantity of fuel during a combustion cycle. Load factor may be determined based on an amount of fuel injected over time. In one aspect, an amount of combusted fuel may be compared to a speed of engine to determine a load factor. During operation under moderate or high-load, all of the fuel injectors 18 may be controlled by controller 28 to inject fuel during one or more injection events within a combustion cycle.

Each fuel injector 18 in an active cylinder 16 may inject fuel during an injection event based on signals from controller 28. Prior to the initiation of an injection event, spill valve 140 may be in an open position (FIG. 2A), allowing fuel to enter fuel passage 106 via supply and return passage 110. Fuel may fill fuel passage 106, fuel passage 108, control chamber 170, and pressure chamber 186. An injection event may be initiated in the fuel injector 18 of each active cylinder 16 by controller 28, which may first cause spill valve 140 to transition to a closed state in which spill valve member 142 rests upon spill valve seat 144. While the spill valve 140 is closed, fuel passage 106 may be sealed from low pressure fuel passage 108. Plunger 102 may be driven downward (e.g., by a cam) while spill valve 140 is closed, applying pressure to the fuel disposed within passage 106, control chamber 170, and pressure chamber 186. Thereafter, DOC valve 160 may be opened, allowing communication between control chamber 170 and low-pressure fuel passage 172, dropping the pressure in control chamber 170, while pressure in pressure chamber 186 remains high. Due to the drop in pressure in control chamber 170, pressurized fuel within pressure chamber 186 acts to move the needle member 182 away from check valve seat 184 (proximally), thereby opening outlet orifices 190 and injecting fuel from orifices 190 into a combustion chamber of cylinder 16. In one aspect, an end of injection may be initiated by the return of DOC valve member 162 to DOC valve seat 164. Thus, during the standard mode, each fuel injector 18 may inject fuel into a combustion chamber.

Internal combustion engine system 12 of the present disclosure may be configured to operate with at least one active cylinder 16 and at least one deactivated cylinder 16. In one aspect, a "deactivated" cylinder is a cylinder in which no combustion event occurs for at least one combustion cycle of internal combustion engine system 12. For example, a "deactivated" may be a cylinder in which no combustion occurs within cylinder 16 for a plurality of consecutive combustion cycles. A deactivated cylinder may have no fuel injected into the cylinder for one or a plurality of combustion cycles. A deactivated cylinder may also be a cylinder in which fuel is injected but is not combusted, e.g., in a dosing strategy as described below.

A cylinder 16 may be deactivated when controller 28 determines that internal combustion engine system 12 is in a low-load state. A low-load state may be a state in which a load factor of internal combustion engine system 12 is less than or equal to 50%. In one aspect, the low-load state may correspond to a state in which the load factor is less than or equal to 20%. In another aspect, the low-load state may correspond to a state in which the load factor is less than or equal to 15%.

Figure 4:
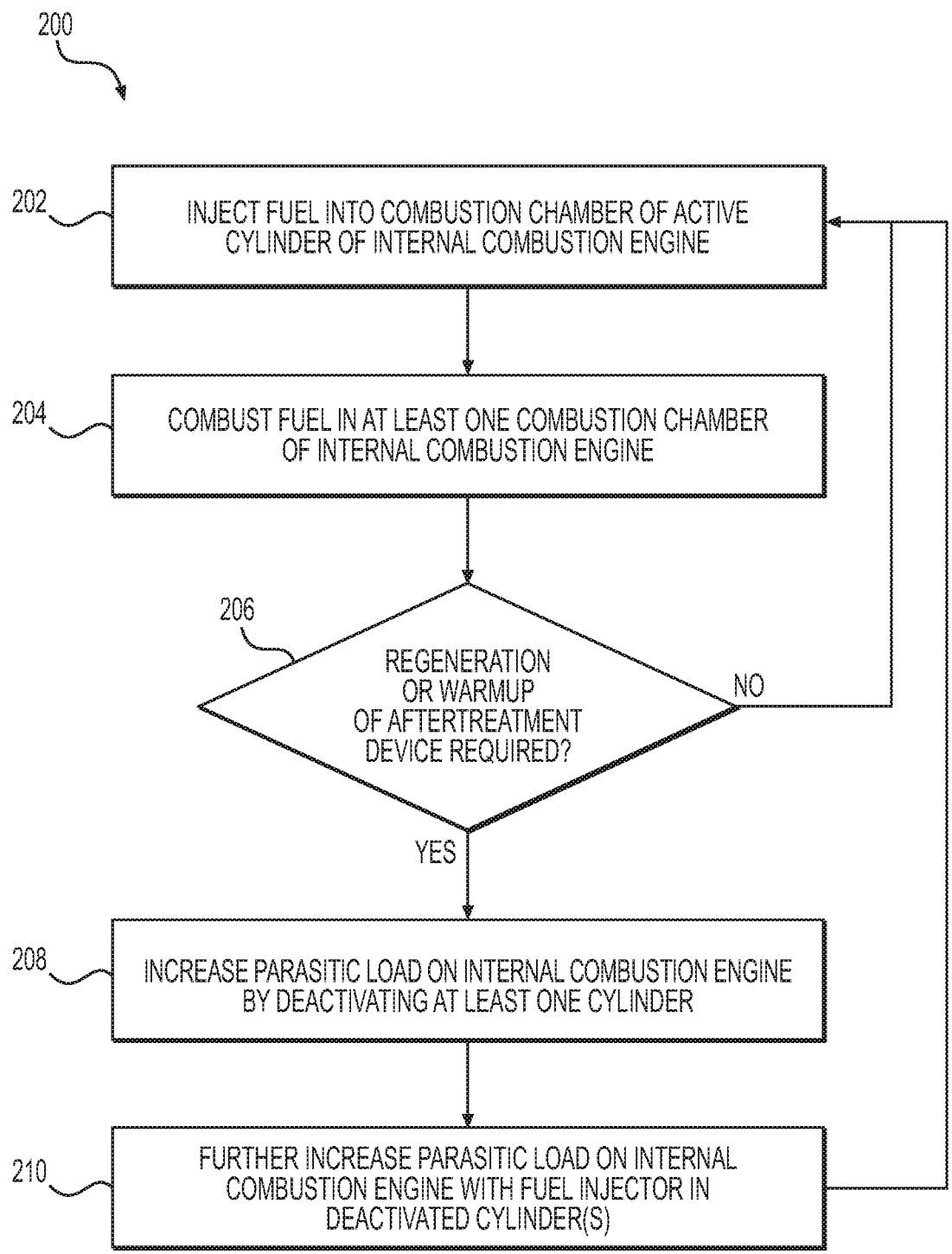
FIG. 4 is a flowchart showing a method of increasing a parasitic load on an internal combustion engine according to an aspect of the present disclosure.

FIG. 4 illustrates an exemplary flow of a method 200 for increasing parasitic load on an internal combustion engine. Method 200 may be performed during an operation of internal combustion engine system 12 in which, during a step 202, fuel may be injected into a combustion chamber of at least one active cylinder 16. In step 204, the fuel injected into each active cylinder 16 during step 202 may be combusted to reciprocate a piston in each active cylinder 16. Steps 202 and 204 may be performed continuously by at least one active cylinder 16 during operation of internal combustion engine system 12.

During the operation of internal combustion engine system 12, controller 28 may determine in step 206 whether a regeneration or a warmup of an aftertreatment device is required (e.g., of one or more aftertreatment devices such as DPF 68, SCR device 70, and/or oxidation device 72). A warmup may be required when controller 28 determines that internal combustion engine system 12 is in a cold start condition when the temperature of engine exhaust, the temperature of the internal combustion engine, or the temperature of an aftertreatment device is below a predetermined temperature. The predetermined threshold temperature may be, for example, a predetermined temperature of exhaust, a predetermined operating temperature of the engine, or a predetermined operating temperature of an aftertreatment device. In one aspect, the predetermined threshold temperature may be lower than a normal operating temperature once internal combustion engine system 12 has warmed-up. For example, the predetermined threshold temperature of the exhaust or aftertreatment device may be 650 degrees Fahrenheit, 550 degrees Fahrenheit, 450 degrees Fahrenheit, or another value. The predetermined threshold temperature for the internal combustion engine may be a 200 degrees Fahrenheit, 150 degrees Fahrenheit, 100 degrees Fahrenheit, or another value. Controller 28 may determine exhaust temperature via temperature sensor 50, aftertreatment device temperature via one or more of sensors 52, 54, and 56, and internal combustion engine temperature via a sensor (not shown) in a coolant passage or other location. The cold start condition may be defined based on a determination that the engine was started from a stopped state. This determination may be the sole condition for the cold start condition, or the cold start condition may be defined based on a start of the engine in combination with a determination that a temperature is lower than a predetermined threshold temperature.

As noted above, step 206 may also include determining whether a regeneration of an aftertreatment device is required. In one example, a regeneration is required when a predetermined time has passed since a previous regeneration. Additionally or alternatively, step 206 may include determining that a regeneration is required when conditions detrimental to the performance of an aftertreatment device is present. For example, a regeneration may be required when a predetermined quantity of soot is present in an aftertreatment device. Step 206 may include requiring regeneration when a catalyst (e.g., SCR device 70 and/or ammonia oxidation device 72) has operated below a desired temperature for a predetermined period of time. The regeneration may further be required based on a determination that a predetermined amount of sulfur is present in SCR device 70. Additionally, step 206 may include determining that engine system 12 has operated at idle or low load for a predetermined period of time (e.g., a load factor remains under a predetermined value for a predetermined period of time).

When a regeneration or warmup is not required (Step 206=NO, method 200 may return to steps 202 and 204 in which internal combustion engine system 12 continues to operate without increasing a parasitic load on internal combustion engine system 12.

When a regeneration or warmup is required (Step 206=YES), a step 208 may be performed to increase parasitic load and increase the temperature of the aftertreatment device. Step 208 may include deactivating at least one cylinder 16. In one example, three cylinders 16 may be deactivated. However, fewer cylinders 16 (e.g., one cylinder or two cylinders) may be deactivated. Deactivating one or more cylinders in step 208 may increase a parasitic load on internal combustion engine system 12 by a first amount to raise exhaust temperature to a first temperature. For example, by deactivating one or more cylinders, the load on internal combustion engine system 12 may increase as pistons in the deactivated cylinders are driven by fewer cylinders and fewer combustion events. Load may also increase as fewer cylinders provide driving power to a transmission or to auxiliary devices. Internal combustion engine system 12 may increase an amount or rate of an injection of fuel to satisfy this increased load, which may increase a temperature of exhaust.

Step 210 may be performed to further increase parasitic load on internal combustion engine system 12. Step 210 may include pulsing one or more spill valve members 142 of injectors 18 in deactivated cylinders 16. For example, spill valve member 142 may be reciprocated in a manner represented in the upper plot shown in FIG. 3. In the displacement plot of FIG. 3, a lower position may correspond to an open position of spill valve 140 in which spill valve member 142 is spaced away from spill valve seat 144 (FIG. 2A). An upper position of the displacement plot of FIG. 3 corresponds to a closed position of spill valve 140 in which spill valve member 142 rests on spill valve seat 144 (FIG. 2B). While spill valve member 142 is pulsed in the manner illustrated in FIG. 3, DOC valve member 162 may be maintained in a constant (closed) position corresponding to a position in which DOC valve member 162 rests upon DOC valve seat 164, fluidly sealing control chamber 170 from low-pressure fuel passage 172. The DOC valve member 162 may be maintained in this position for a plurality of combustion cycles, except when a dosing strategy is performed in the deactivated cylinder 16.

Figure 3:
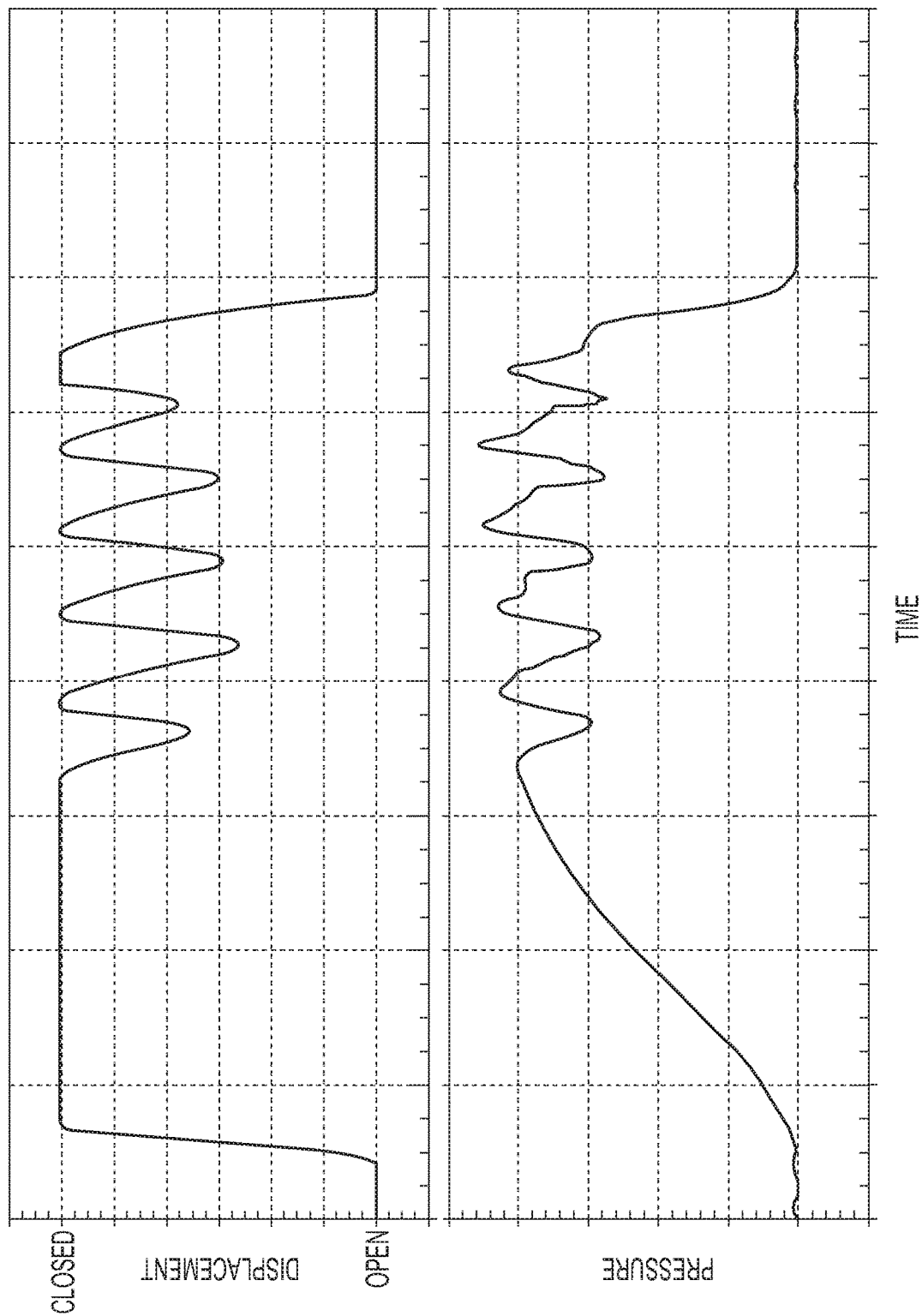
FIG. 3 is a plot showing injector spill valve displacement over time, and a plot showing pressure over time during an operation to increase parasitic load on the internal combustion engine of FIG. 1.

As can be seen in the pressure plot of FIG. 3, when spill valve member 142 is in the closed position, a pressure of fuel located within passages 106 and pressure chamber 186 increases. This pressure may be relieved by allowing spill valve member 142 to return to a fully open position, allowing pressurized fluid to flow to fuel passage 108 and supply and return passage 110. In one aspect, prior to returning spill valve member 142 to the fully open position, spill valve member 142 may be reciprocated between the fully closed position (FIG. 2B) and a partially open position to maintain pressure a high level (e.g., 75% or more of a maximum pressure). In one aspect, spill valve member 142 may be reciprocated between a fully closed and partially open position a plurality of times in an injection cycle. Member 142 may be moved to a partially open position two times, three times, four times, five times (FIG. 3), or more than five times, before returning to a fully open position. By reciprocating member 142 in this manner, pressure may be maintained at a relatively high level without exposing the components of fuel injector 18 to excessive pressure. The increase of pressure within each fuel injector 18 may increase the parasitic load on internal combustion engine system 12 by increasing a pressure against which fuel is pumped.

Step 210 may increase a parasitic load by a second amount that, in combination with the first amount discussed above, may result in a sufficient parasitic load to increase a temperature of exhaust to a second temperature that is equal to or greater than the warmup temperature threshold or the regeneration temperature threshold. Step 210 may include pulsing a plurality of spill valve members 142 of injectors 18 provided for respective deactivated cylinders 16. In one aspect, when three cylinders 16 are deactivated, one, two, or three members 142 may be pulsed. By increasing the number of pulsed members 142, the second amount of parasitic load may be increased accordingly.

Step 210 may be performed repeatedly to increase a temperature of the aftertreatment device, or to maintain an increased temperature. In one aspect, step 210 (and step 208) may be discontinued when temperature of exhaust reaches the warmup temperature threshold (e.g., when a cold start condition was determined in step 204). Step 210 (and step 208) may be performed to maintain an exhaust temperature above the regeneration temperature threshold for a predetermined period of time based on a determination in step 206 that a predetermined quantity of soot is present, a low temperature condition of an aftertreatment device has been measured for a predetermined period of time, a predetermined quantity of sulfur is present, and/or engine system 12 has operated at idle or low load for a predetermined period of time that necessitates hydrocarbon removal. The regeneration temperature threshold and the predetermined period of time may be determined based on the particular condition determined in step 206.

Figure 5:
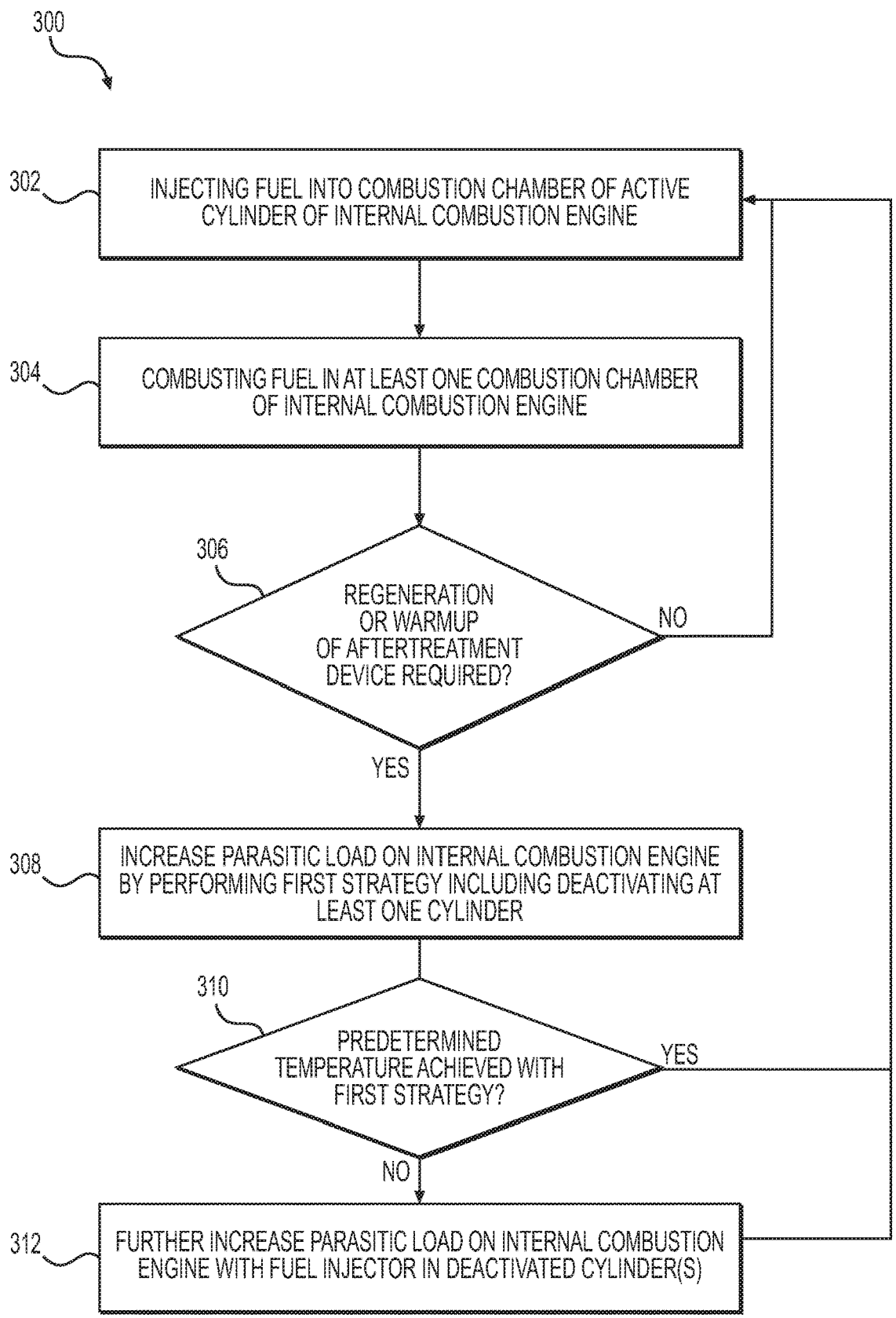
FIG. 5 is a flowchart showing a method of increasing a parasitic load on an internal combustion engine according to an aspect of the present disclosure.

FIG. 5 illustrates another exemplary method 300 for increasing parasitic load on an internal combustion engine. Step 300 may include a step 302 in which fuel may be injected into at least one active cylinder 16, and a step 304 in which the fuel injected into the at least one active cylinder 16 is combusted. Steps 302 and 304 may be performed in the same manner as steps 202 and 204, and may be performed continuously by at least one active cylinder 16 during operation of internal combustion engine system 12.

Step 306 may include determining whether a regeneration or warmup of aftertreatment devices is required. Step 306 may be performed in the same manner as step 206 discussed above. When no warmup condition or regeneration is required (Step 306=NO), method 300 returns to steps 302 and 304.

When a determination in step 306 is affirmative (Step 306=YES), a condition for increasing the temperature of an aftertreatment device may exist, and the process may proceed to step 308. In step 308 a first strategy may be determined to increase a parasitic load on internal combustion engine system 12. This first strategy may include, for example, operating a fan of the internal combustion engine system 12, even when the operation of the fan is not necessary. Instead of, or in addition to, the operation of a fan, other auxiliary devices may be operated during the first strategy. The first strategy may include deactivating one or more cylinders 16, operating one or more fans, partially closing an air intake throttle valve such as air intake valve 82, or retarding injection timing. In one aspect, the first strategy my include more than one or all of these actions.

The first strategy may increase a parasitic load by a first amount and thereby raise an exhaust temperature to a first temperature. During the operation of the first strategy, controller 28 may determine whether the predetermined temperature threshold has been reached by increasing the parasitic load by the first amount. As noted above, the predetermined temperature threshold may include a warmup or regeneration temperature threshold of the exhaust. When the exhaust temperature is determined to be above the relevant threshold, the determination in step 310 may be affirmative (Step 310=YES) and method 300 may return to steps 302 and 304.

When controller 28 determines that the first strategy does not achieve the predetermined temperature, a second strategy may be performed in a step 312. When the first strategy is not expected to increase the temperature above the predetermined temperature, controller 28 may proactively proceed to step 312 and initiate the second strategy.

In step 312, a second strategy may be performed to further increase the parasitic load on internal combustion engine system 12. In one aspect, the second strategy may include pulsing a spill valve member 142 of a fuel injector 18. The fuel injector 18 in which the spill valve member 142 is pulsed may be disposed within a cylinder that was deactivated in the first strategy (e.g., in step 308). Alternatively, step 312 may include deactivating one or more cylinders 16 and pulsing the spill valve members 142 of the fuel injectors 18 therein. Thus, step 312 may increase parasitic load on internal combustion engine system 12 by a second amount. Step 312 may be performed in the same manner as step 210 above.

In one aspect, steps 210 and 312 may be performed without injecting any fuel for one or more combustion cycles. Alternatively, steps 210 and 312 may include a dosing strategy. In order to perform a dosing strategy, controller 28 may cause a spill valve member 142 to pulse in the manner described above. However, instead of injecting no fuel in each combustion cycle, a quantity of fuel may be injected. This dosing may be facilitated by opening DOC valve 160, e.g., by moving DOC valve member 162 away from DOC valve seat 164, at a timing at which pressurized fuel is present within pressure chamber 186. This movement of DOC valve member 162 may result in an injection of a predetermined quantity of fuel into the combustion chamber of a deactivated cylinder 16. However, combustion of this dosing fuel may be prevented by controlling the timing of the dosing injection. The dosing fuel may atomize and exit the combustion chamber via an opening of the exhaust valve without combusting. This dosing fuel may then pass, via aftertreatment system 60, to an aftertreatment device where the dosing fuel ignites. For example, dosing fuel may pass to DPF 68 where the dosing fuel combusts, thereby performing regeneration of DPF 68.

In one aspect, the dosing fuel may be injected by a fuel injector 18 in which the spill valve member 142 is pulsed as shown in FIG. 3, for example. Thus, an injection of dosing fuel may be performed by moving DOC valve member 162 away from DOC valve seat 164 at a timing at which pressure of fuel is relatively high within the same injector 18. As controller 28 may control the pressure within fuel injector 18 (e.g., by partially or fully opening spill valve 140), an injection of dosing fuel may be performed at a higher pressure than the pressure at which the fuel was provided to fuel injector 18.

By controlling the operation of spill valve solenoid 146 and DOC valve solenoid 166, controller 28 may control the operation of each fuel injector 18 to create sufficient parasitic load by pressurizing fuel without a combustion event in cylinder 16. The parasitic load created by the strategy of pulsing a spill valve member may, when combined with additional strategies, improve the ability of an engine to perform regeneration, even under low external load conditions. For example, a combination of a strategy including one or more of: intake throttle valve manipulation, cylinder deactivation, or optimized (e.g., retarded) injection timing, in combination with pulsation of a spill valve, may increase parasitic load sufficiently to raise a temperature of an aftertreatment system and reduce total emissions. The disclosed system and methods may be operated and performed during a certification cycle or evaluation to facilitate a warmup to bring the aftertreatment system to an operational temperature. As noted above, this strategy may be performed to raise an aftertreatment device to a regeneration temperature.

It will be apparent to those skilled in the art that various modifications and variations can be made to the disclosed method and system for exhaust aftertreatment without departing from the scope of the disclosure. Other embodiments of the method and system for exhaust aftertreatment will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method of increasing parasitic load on an internal combustion engine, comprising:
    injecting a fuel into a combustion chamber of an active cylinder of the internal combustion engine;
    combusting the injected fuel in the combustion chamber of the active cylinder;
    determining that increasing a temperature of an exhaust aftertreatment device is required;
    increasing a parasitic load on the internal combustion engine by deactivating a cylinder, wherein no fuel is injected in the deactivated cylinder for a combustion cycle of the internal combustion engine; and
    further increasing the parasitic load by pulsing a spill valve member of a spill valve of a fuel injector in the deactivated cylinder between a fully closed position and an at least partially open position.

2. The method of claim 1, wherein no fuel is injected in the deactivated cylinder for a plurality of combustion cycles.

3. The method of claim 1, wherein a pressurized condition is maintained in a fuel passage of the fuel injector during the pulsing of the spill valve member.

4. The method of claim 1, including pulsing a plurality of spill valve members of a respective plurality of fuel injectors in a plurality of deactivated cylinders.

5. The method of claim 1, further including at least one of: operating one or more fans, partially closing an intake throttle valve, or retarding injection timing of the fuel injector in the active cylinder, during the pulsing of the spill valve member.

6. The method of claim 1, wherein increasing the parasitic load on the internal combustion engine includes pulsing the spill valve member of the spill valve between the fully closed position and the at least partially open position at least two times before the spill valve member returns to a fully open position.

7. The method of claim 1, wherein the fuel injector in at least one of the deactivated cylinders includes a control valve having a control valve member, the method further including maintaining the control valve member in a constant position while the spill valve member is pulsed.

8. The method of claim 7, wherein the control valve member is maintained in the constant position for a plurality of combustion cycles of the active cylinder.

9. The method of claim 1, wherein the condition for increasing the temperature of the exhaust aftertreatment device is determined to be satisfied based on a load factor of the engine being equal to or less than 20%.

10. The method of claim 1, wherein the determining that increasing temperature is required is based on whether the internal combustion engine is in a cold start condition.

11. The method of claim 1, wherein the determining that increasing temperature is required is based on whether a regeneration condition of the exhaust aftertreatment device is required.

12. A method of increasing parasitic load on an internal combustion engine, comprising:
    injecting a fuel into a combustion chamber of an active cylinder of the internal combustion engine;
    combusting the injected fuel in the combustion chamber of the active cylinder;
    determining that increasing a temperature of an exhaust aftertreatment device is required;
    increasing a parasitic load on the internal combustion engine by performing a first strategy that includes deactivating at least one cylinder;

determining that the first strategy does not provide a predetermined exhaust temperature; and further increasing the parasitic load by pulsing a spill valve member of a spill valve of a fuel injector in the deactivated cylinder between a fully closed position and an at least partially open position.

13. The method of claim 12, wherein increasing the parasitic load causes an increase in an exhaust temperature of the internal combustion engine, wherein the first strategy increases the exhaust temperature to a first temperature and the pulsing the spill valve member increases the exhaust temperature to a second temperature above the first temperature, and wherein the second temperature is equal to or higher than the predetermined exhaust temperature.

14. The method of claim 13, wherein the predetermined exhaust temperature corresponds to a minimum temperature for regeneration of the aftertreatment device.

15. The method of claim 14, wherein the minimum temperature is determined based on a regeneration condition of the aftertreatment device, the regeneration condition including a predetermined quantity of soot in the aftertreatment device, a low temperature condition of the aftertreatment device, a presence of a predetermined quantity of sulfur in the aftertreatment device, or an idle condition of the internal combustion engine.

16. The method of claim 12, wherein the determining that increasing temperature is required is based on whether the temperature of an exhaust aftertreatment device corresponds to a cold start condition.

17. The method of claim 16, further including discontinuing the pulsing of the spill valve member when the exhaust temperature reaches the predetermined exhaust temperature.

18. A internal combustion engine, comprising:
a plurality of cylinders, each of the plurality of cylinders having a combustion chamber;
a plurality of fuel injectors each configured to inject fuel into a respective combustion chamber, each of the fuel injectors including a spill valve having a spill valve member;
an aftertreatment device configured to receive exhaust produced by combustion in the plurality of cylinders;
a sensor configured to measure at least one of an exhaust temperature or a temperature of the aftertreatment device; and
a controller configured to control each of the fuel injectors such that:
a first fuel injector of the plurality of fuel injectors injects fuel for combustion in an active cylinder of the plurality of cylinders
a spill valve member of a second fuel injector of the plurality of fuel injectors in a deactivated cylinder of the plurality of cylinders is pulsed between a fully closed position and an at least partially open position; and
the second fuel injector injects fuel into the deactivated cylinder at a timing that avoids combustion of the fuel in the deactivated cylinder.

19. The internal combustion engine of claim 18, wherein the fuel injected in the deactivated cylinder is provided to the aftertreatment device.

20. The internal combustion engine of claim 19, wherein the aftertreatment device is an oxidation catalyst that receives the fuel injected into the deactivated cylinder.

* * * * *